United States Patent
Oishi et al.

(10) Patent No.: US 11,498,306 B2
(45) Date of Patent: Nov. 15, 2022

(54) SOUND-ABSORBING PANEL AND MANUFACTURING METHOD FOR SAME

(71) Applicants: IHI CORPORATION, Tokyo (JP); JAPAN AEROSPACE EXPLORATION AGENCY, Tokyo (JP); GIFU PLASTIC INDUSTRY CO., LTD., Gifu (JP)

(72) Inventors: Tsutomu Oishi, Tokyo (JP); Masahiro Hojo, Tokyo (JP); Shingo Shibagaki, Gifu (JP)

(73) Assignees: IHI CORPORATION, Tokyo (JP); JAPAN AEROSPACE EXPLORATION AGENCY, Tokyo (JP); GIFU PLASTIC INDUSTRY CO., LTD., Gifu (JP)

( * ) Notice: Subject to any disclaimer, the term of this patent is extended or adjusted under 35 U.S.C. 154(b) by 426 days.

(21) Appl. No.: 16/619,118

(22) PCT Filed: Jun. 5, 2018

(86) PCT No.: PCT/JP2018/021486
§ 371 (c)(1),
(2) Date: Dec. 4, 2019

(87) PCT Pub. No.: WO2018/225706
PCT Pub. Date: Dec. 13, 2018

(65) Prior Publication Data
US 2020/0101690 A1   Apr. 2, 2020

(30) Foreign Application Priority Data
Jun. 7, 2017   (JP) .............................. JP2017-112560

(51) Int. Cl.
*B32B 3/12*   (2006.01)
*B32B 3/26*   (2006.01)
(Continued)

(52) U.S. Cl.
CPC ................ *B32B 3/12* (2013.01); *B32B 3/266* (2013.01); *B32B 7/12* (2013.01); *B32B 27/34* (2013.01);
(Continued)

(58) Field of Classification Search
CPC ............. F05D 2260/96; F05D 2230/60; F05D 2220/323; B64D 2033/0206; B64D 33/02;
(Continued)

(56) References Cited

U.S. PATENT DOCUMENTS 4,344,995 A * 8/1982 Hammer ............... B29D 24/007
                                                    428/137
6,051,302 A    4/2000 Moore
(Continued)

FOREIGN PATENT DOCUMENTS

GB    2122540 A *  1/1984   .......... B29C 70/088
GB    2122540 A    1/1984
(Continued)

OTHER PUBLICATIONS

Extended European Search Report for Application No. 18812702.1 dated Mar. 10, 2021, 9 pages.

*Primary Examiner* — Forrest M Phillips
(74) *Attorney, Agent, or Firm* — Cantor Colburn LLP

(57) ABSTRACT

A sound-absorbing panel to be used affixed to a jet engine of an aircraft, provided with: a resin core layer having a first surface, a second surface disposed on the side opposite from the first surface, and multiple partitions extending between the first surface and second surface so as to partition multiple cells; a resin first skin layer laminated on the first surface of the core layer; and a resin second skin layer laminated on the second surface of the core layer. The first skin layer is disposed so as to face the external space while in use, and has multiple through-holes for providing communication
(Continued)

between internal spaces of the multiple cells and external space faced by the first skin layer. The core layer has openings for providing communication between the internal spaces of the multiple cells and external space of the core layer.

5 Claims, 6 Drawing Sheets

(51) Int. Cl.
 | | |
 |---|---|
 | *B32B 7/12* | (2006.01) |
 | *B32B 27/34* | (2006.01) |
 | *B32B 37/12* | (2006.01) |
 | *B64D 33/02* | (2006.01) |
 | *F02C 7/24* | (2006.01) |
 | *G10K 11/168* | (2006.01) |

(52) U.S. Cl.
CPC .............. *B32B 37/12* (2013.01); *B64D 33/02* (2013.01); *F02C 7/24* (2013.01); *G10K 11/168* (2013.01); *B32B 2307/10* (2013.01); *B32B 2605/18* (2013.01); *B32B 2607/00* (2013.01); *B64D 2033/0206* (2013.01); *F05D 2220/323* (2013.01); *F05D 2230/60* (2013.01); *F05D 2260/96* (2013.01)

(58) Field of Classification Search
CPC ............ B32B 2607/00; B32B 2605/18; B32B 2307/10; B32B 37/12; B32B 27/34; B32B 7/12; B32B 3/266; B32B 3/12; G10K 11/168; F02C 7/24

See application file for complete search history.

(56) References Cited

U.S. PATENT DOCUMENTS

| | | | |
|---|---|---|---|
| 6,210,773 B1 * | 4/2001 | Moore | ............. B32B 5/26 |
| | | | 428/116 |
| 6,440,521 B1 | 8/2002 | Moore | |
| 8,387,747 B2 * | 3/2013 | Koike | ............. B32B 15/12 |
| | | | 181/290 |
| 2006/0080941 A1 | 4/2006 | Ishii et al. | |
| 2017/0080675 A1 | 3/2017 | Dodworth | |

FOREIGN PATENT DOCUMENTS

| | | | | |
|---|---|---|---|---|
| JP | S574814 A | 1/1982 | | |
| JP | S5967407 A | 5/1984 | | |
| JP | H06173772 A | 6/1994 | | |
| JP | H10175263 A | 6/1998 | | |
| JP | 2006103403 A | 4/2006 | | |
| JP | 3994404 B2 | 10/2007 | | |
| WO | WO-2009017864 A3 * | 4/2009 | ........... B29C 65/505 | |
| WO | 2015187879 A1 | 12/2015 | | |
| WO | WO-2017017369 A1 * | 2/2017 | ............. B32B 15/14 | |

\* cited by examiner

SOUND-ABSORBING PANEL AND MANUFACTURING METHOD FOR SAME

TECHNICAL FIELD

The present disclosure relates to a sound-absorbing panel and a method for manufacturing the sound-absorbing panel. More specifically, the present disclosure relates to a sound-absorbing panel that is attached to and used with a jet engine of an aircraft and a method for manufacturing the sound-absorbing panel.

BACKGROUND ART

To absorb noise produced in an air passage of a jet engine for an aircraft, a sound-absorbing panel is attached at a position facing an air passage. A conventional sound-absorbing panel attached to a jet engine is made of a metal having superior heat resistance, low-temperature resistance, and impact resistance. The sound-absorbing panel is made of a metal taking into consideration the environment aircrafts will be exposed to, such as flights at altitudes of 10,000 meters or higher, takeoffs and landings at airports in hot desert regions, or the like.

Patent Document 1 discloses a sound-absorbing panel arranged in a fan duct of a jet engine of an aircraft. The sound-absorbing panel includes a front surface layer facing an air passage, a rear surface layer bonded with a wall surface of the fan duct, and a honeycomb layer sandwiched between the front surface layer and the rear surface layer. The front surface layer facing the air passage is formed by a sheet of metal having a many pores that are continuous with the honeycomb layer. The sound-absorbing panel functions as a Helmholtz resonator to absorb noise inside the fan duct.

PRIOR ART LITERATURE

Patent Literature

Patent Document 1: Japanese Laid-Open Patent Publication No. 57-4814

SUMMARY OF THE INVENTION

Problems to be Solved by the Invention

In order to improve the performance of the jet engine, a ratio (bypass ratio) of air bypassing a combustion chamber and discharged rearward from a nacelle to air drawn from the front of the nacelle into a fan case may be increased. This increases the diameter of the jet engine and increases noise inside the air passage, through which the bypass-flow passes. Further, an increase in the diameter of the jet engine increases the surface area of the air passage. This increases the area over which the sound-absorbing panel is arranged to absorb the noise in the air passage. As a result, the weight of the sound-absorbing panel is increased. Thus, the conventional metal sound-absorbing panel increases the total weight of the aircraft and adversely affects the fuel efficiency.

Moreover, when the aircraft takes off or lands at an airport in a hot desert region of a tropical zone, sand may enter the fan duct and scratch the surface of the metal sound-absorbing panel. Scratches in the surface of the sound-absorbing panel may easily disturb the air current in the fan duct and lower the combustion efficiency of the aircraft.

One object of the present disclosure is to provide a sound-absorbing panel that is light in weight and has superior scratch resistance.

Means for Solving the Problem

A sound-absorbing panel that solves the above problems is attached to and used with a jet engine of an aircraft. The sound-absorbing panel includes a core layer, a first skin layer, and a second skin layer. The core layer is formed from a resin and includes a first surface, a second surface at a side opposite to the first surface, and a plurality of partition walls. The partition walls extend between the first surface and the second surface and partition a plurality of cells. The first skin layer is formed from a resin and laminated on the first surface of the core layer. The second skin layer is formed from a resin and laminated on the second surface of the core layer. The first skin layer is exposed to an external space when in use and includes a plurality of through holes connecting an internal space of the cells and the external space to which the first skin layer is exposed. The core layer includes a plurality of openings connecting the internal space of the cells and the external space of the core layer.

The sound-absorbing panel configured as described above is attached to and used with a jet engine of an aircraft. The sound-absorbing panel includes the core layer including the first surface and the second surface, the first skin layer laminated on the first surface of the core layer, and the second skin layer laminated on the second surface of the core layer. The core layer, the first skin layer, and the second skin layer are all formed from a resin. This reduces the weight of the entire sound-absorbing panel and consequently reduces the weight of the aircraft. Further, the first skin layer is formed from a resin. This limits scratching of the first skin layer even when sand enters the air passage where the sound-absorbing panel is arranged. Therefore, the obtained sound-absorbing panel is light in weight and has superior scratch resistance.

Further, the first skin layer of the sound-absorbing panel includes the through holes connecting the internal space of the cells and the external space of the first skin layer. Thus, the sound-absorbing panel functions as a Helmholtz resonator and absorbs the noise propagating through the external space in a preferred manner. Moreover, the core layer includes the openings connecting the internal space of the cells and the external space of the core layer. For example, water may be condensed inside the sound-absorbing panel due to the difference in the temperature when an aircraft is flying and the temperature when the aircraft is taking off or landing. Further, rain water or the like may enter the sound-absorbing panel. Such water, for example, may freeze into a mass of ice when the aircraft is flying and produce an impact to the sound-absorbing panel. In this respect, the sound-absorbing panel includes the openings connecting the internal space of the cells and the external space of the core layer. Thus, the sound-absorbing panel can release condensed water, rain water, or the like from the sound-absorbing panel through the openings. This limits static impacts applied to the sound-absorbing panel by a mass of ice or the like produced inside the core layer.

In the above sound-absorbing panel, the resin may be a polyamide resin.

In the above sound-absorbing panel, the polyamide resin may be a nylon having a water absorption rate of 1.0% or less.

In the above sound-absorbing panel, the polyamide resin may be nylon 6.

A sound-absorbing panel that solves the above problems is attached to and used with a jet engine of an aircraft. The sound-absorbing panel includes a core layer, a first skin layer, and a second skin layer. The core layer is formed from a resin and includes a first surface, a second surface at a side opposite to the first surface, and a plurality of partition walls. The partition walls extend between the first surface and the second surface and partition a plurality of cells. The first skin layer is formed from a resin and laminated on the first surface of the core layer. The second skin layer is formed from a resin and laminated on the second surface of the core layer. The first skin layer is a laminated body including an outer layer, an inner layer, and an intermediate layer. The outer layer is exposed to an external space when in use. The intermediate layer is sandwiched between the outer layer and the inner layer. A resin forming the intermediate layer has a higher hardness than a resin forming the outer layer and the inner layer. The first skin layer includes a plurality of through holes connecting an internal space of the cells and the external space to which the outer layer is exposed.

In the above sound-absorbing panel, the core layer may be adhered to the first skin layer and the second skin layer by a modified resin.

In the above sound-absorbing panel, the second skin layer has a thickness that is less than that of the first skin layer.

In the above sound-absorbing panel, the core layer may include an outer wall forming the first surface and adhered to the first skin layer. The through holes may extend through the first skin layer and the outer wall.

In the above sound-absorbing panel, the core layer may be a honeycomb structure.

A method that solves the above problems is a method for manufacturing a sound-absorbing panel attached to and used with a jet engine of an aircraft. The method includes forming a resin core layer including a first surface, a second surface at a side opposite to the first surface, and a plurality of partition walls extending between the first surface and the second surface and partitioning a plurality of cells. The method further includes forming a plurality of openings in the core layer to connect an internal space of the cells and an external space of the core layer, bonding a first skin layer formed from a resin to the first surface of the core layer, bonding a second skin layer formed from a resin to the second surface of the core layer, and forming a plurality of through holes in the first skin layer to connect the internal space of the cells and the external space to which the first skin surface is exposed.

In the above manufacturing method, the first skin layer, the core layer, and the second skin layer that are bonded together form a hollow structure. The method may further include bending the hollow structure.

EMBODIMENT OF THE INVENTION

A sound-absorbing panel and a method for manufacturing the same will now be described.

Figure 1:
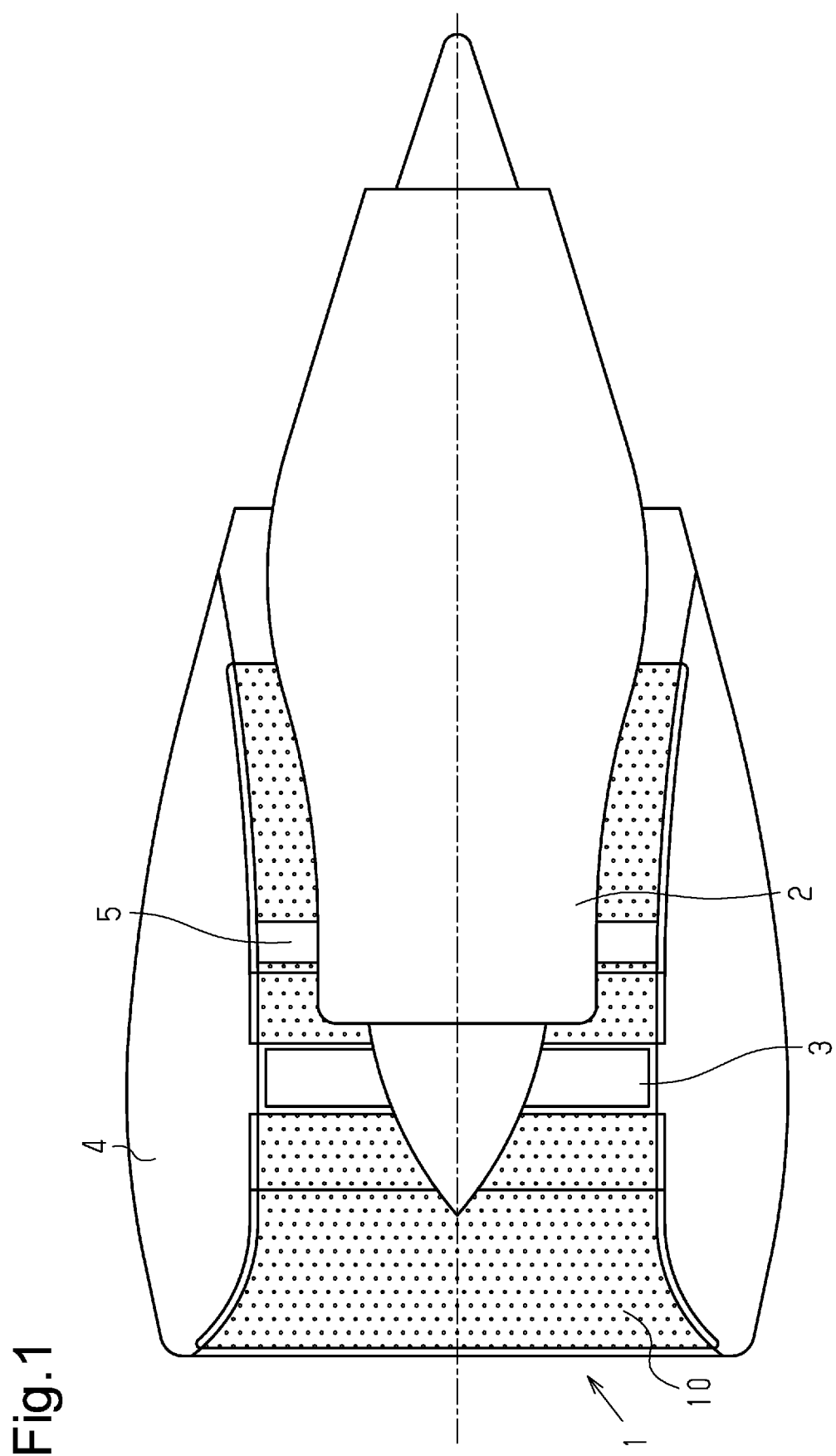
FIG. 1 is a diagram illustrating the structure of a jet engine of an aircraft.

As shown in FIG. 1, a jet engine 1 of an aircraft uses air as working fluid to obtain a thrust by drawing air from the front and discharging the air toward the rear. The jet engine 1 includes an engine 2 and a fan 3 located at the front of the engine 2. The engine 2 includes a compression chamber, a combustion chamber, and a turbine. The engine 2 is accommodated in a nacelle 4.

The air drawn from the front of the jet engine 1 is compressed by the fan 3. Part of the compressed air flows through a structural guide vane 5 between the nacelle 4 and the engine 2 into an air passage and is directly discharged toward the rear. This generates thrust of the aircraft. The rest of the compressed air is drawn into the engine 2. The drawn-in air is compressed in the compression chamber and combusted in the combustion chamber to drive the turbine, which is the drive source of the fan 3.

The jet engine 1 includes sound-absorbing panels 10 to absorb noise. The sound-absorbing panels 10 are attached to the jet engine 10 facing an external space such as the air passage, through which noise propagates. In addition to the air passage, noise is produced between the fan 3 and the structural guide vane 5 due to aerodynamic interference.

As shown in FIG. 1, the sound-absorbing panels 10 are attached to, for example, the inner circumferential surface of the nacelle 4 at three locations, namely, frontward from the fan 3, between the fan 3 and the structural guide vane 5, and rearward from the structural guide vane 5. A sound-absorbing panel 10 may also be attached to an outer circumferential surface of the engine 2. FIG. 1 is a cross-sectional view of the jet engine 1 showing the inner air passage to facilitate understanding of the locations where the sound-absorbing panels 10 are attached to the inner circumferential surface of the nacelle 4.

Figure 2A:
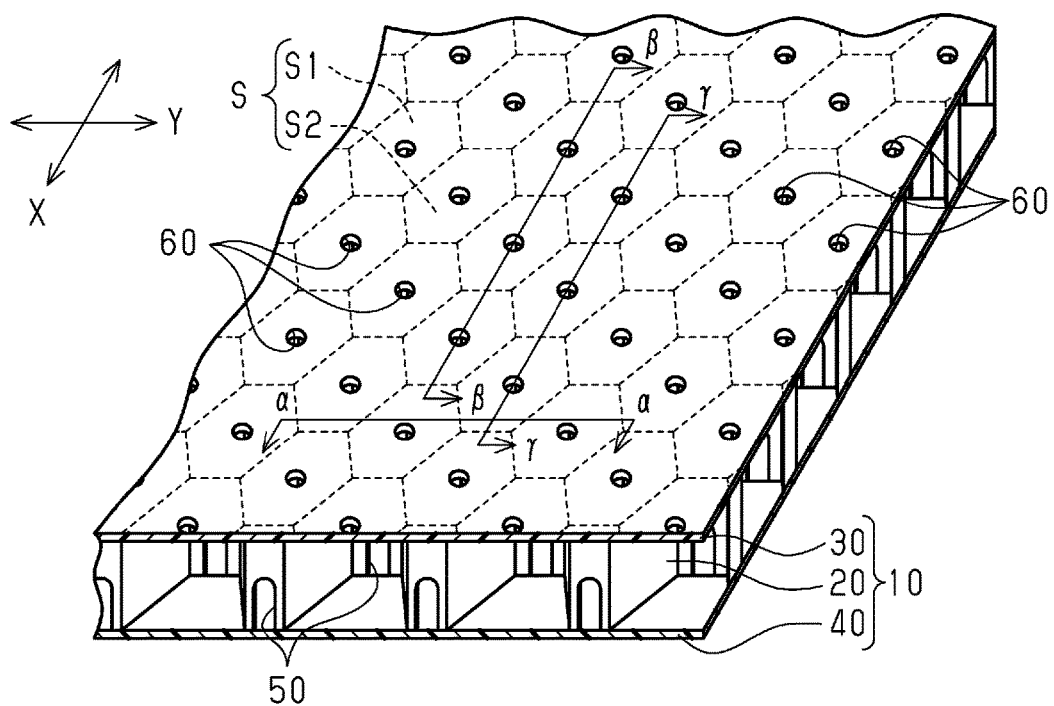
FIG. 2A is a perspective view of a sound-absorbing panel in accordance with one embodiment.

As shown in FIG. 2A, each sound-absorbing panel 10 includes a core layer 20, a first sheet layer 30, and a second sheet layer 40. The core layer 20 includes a first surface, a second surface, and a plurality of cells S. The second surface is arranged at a side opposite to the first surface. The cells S are arranged next to one another between the first surface and the second surface. The first sheet layer 30 is laminated on the first surface of the core layer 20 (upper surface in FIG. 2A) and the second sheet layer 40 is laminated on the second surface of the core layer 20 (lower surface in FIG. 2A). The sound-absorbing panel 10 is attached to the jet engine 1 so that the first sheet layer 30 is exposed to, for example, the air passage. In the description hereafter, the side of the core layer 20 where the first sheet layer 30 is located will be referred to as a front side or an upper side of the sound-absorbing panel 10. Further, the side of the core layer 20 where the second sheet layer 40 is located will be referred to as a rear side or a lower side of the sound-absorbing panel 10.

Figure 2B:
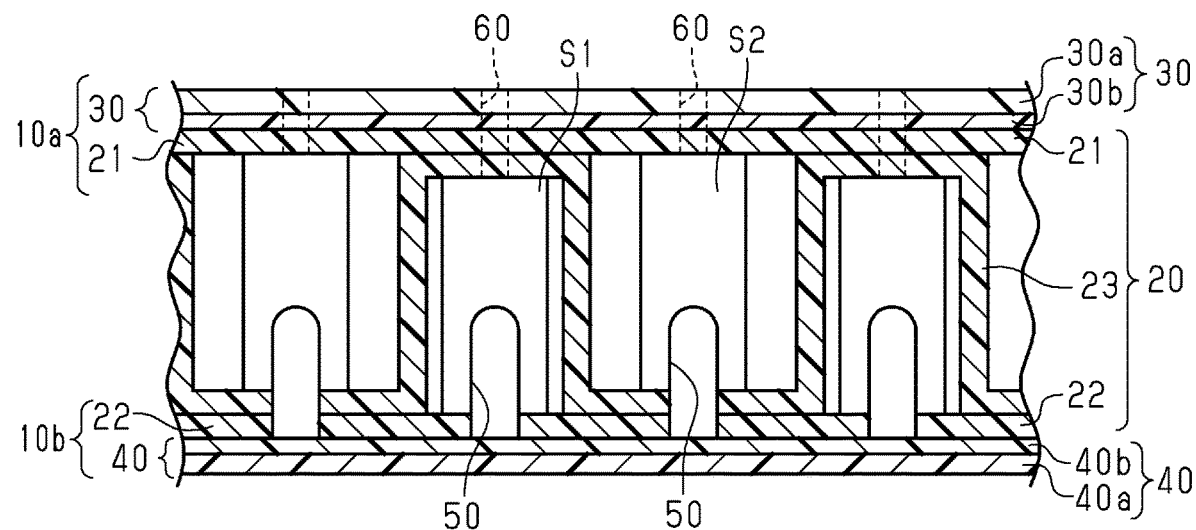
FIG. 2B is a cross-sectional view taken along line α-α in FIG. 2A.

As shown in FIG. 2B, the core layer 20 is formed by folding a single sheet of polyamide resin having a predetermined form. The core layer 20 includes a first outer wall 21, a second outer wall 22, and a plurality of partition walls 23 extending between the first outer wall and the second outer wall. Six partition walls 23 form a hexagonal hollow portion. The first outer wall 21 forms the first surface of the core layer 20 and the second outer wall 22 forms the second surface of the core layer 20. The first outer wall 21, the second outer wall 22, and six partition walls 23 form a hexagonal, columnar cell S inside the core layer 20. Specifically, the first outer wall 21 and the first sheet layer 30 of the core layer 20 form a first wall 10a, which is a front surface of each cell S, and the second outer wall 22 and the second sheet layer 40 of the core layer 20 form a second wall 10b, which is a rear surface of each cell S.

FIG. 2B is a cross-sectional view showing a state in which first cells S1 and second cells S2, which will be described later, are alternately arranged. Further, in the drawings, dimensions, for example, thickness and length of the core layer 20 and the sheet layers 30 and 40 do not depict actual scale.

Figure 3A:
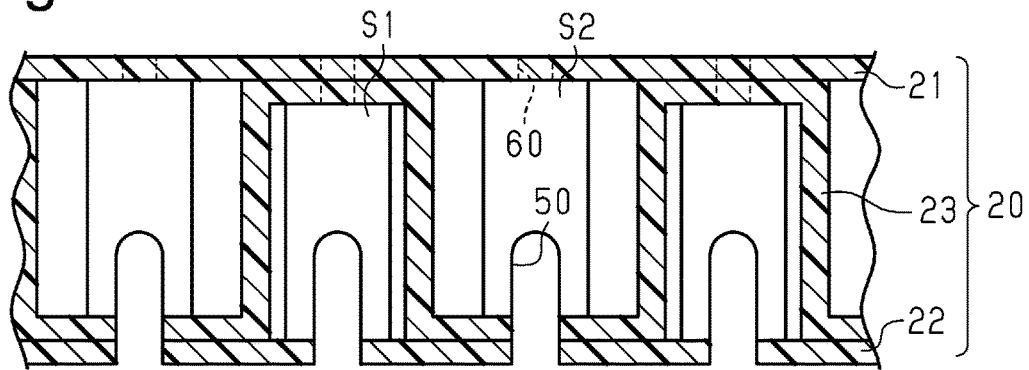
FIG. 3A is a cross-sectional view of a core layer taken along line α-α in FIG. 2A.
Figure 3B:
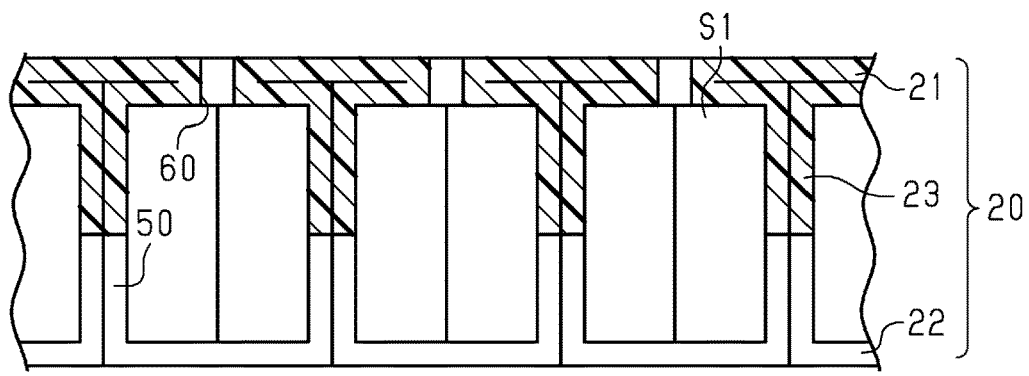
FIG. 3B is a cross-sectional view of the core layer taken along line β-β in FIG. 2A.
Figure 3C:
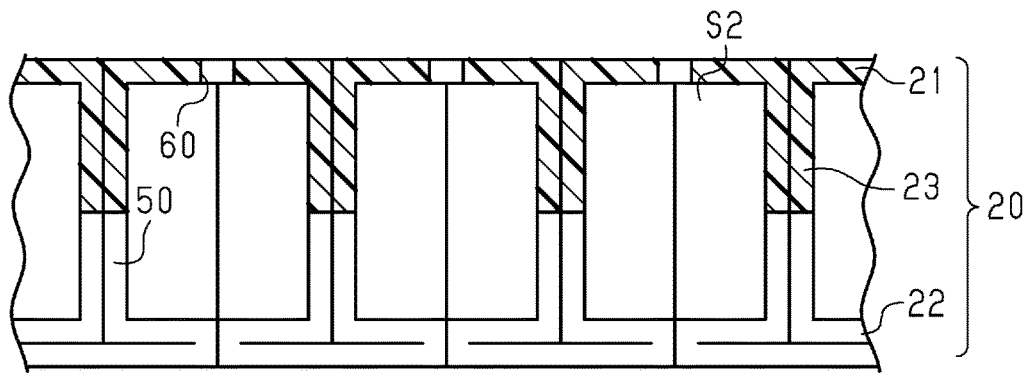
FIG. 3C is a cross-sectional view of the core layer taken along line γ-γ in FIG. 2A.

As shown in FIGS. 3A to 3C, the cells S partitioned inside the core layer 20 include first cells S1 and second cells S2, which have different structures. In order to facilitate understanding of the structure of the core layer 20, the first sheet layer 30 and the second sheet layer 40 are omitted from the sound-absorbing panel 10 in the cross-sectional views of the core layer 20 shown in FIGS. 3A to 3C.

As shown in FIG. 3B, the first cells S1 each include a first end closed by the double-layered first outer wall 21 and a second end closed by the single-layered second outer wall 22. The two layers forming the double-layered first outer wall 21 are bonded with each other.

As shown in FIG. 3C, the second cells S2 each include a first end closed by the single-layered first outer wall 21 and a second end closed by the double-layered second outer wall 22. The two layers forming the double-layered second outer wall 22 are bonded with each other.

As shown in FIGS. 3B and 3C, a double-layered partition walls 23 partitions two adjacent first cells S1 and two adjacent second cells S2. In contrast, as shown in FIG. 3A, a single-layered partition wall 23 partitions adjacent ones of the first cell S1 and the second cell S2.

As shown in FIG. 2A, the first cells S1 are arranged in a line in direction X, and the second cells S2 are arranged in a line in direction X. The sound-absorbing panel 10 includes lines of the first cells S1 and lines of the second cells S2, which are alternately arranged adjacent in direction Y that is orthogonal to direction X. The core layer 20 has a honeycomb structure including the first cells S1 and the second cells S2. The sound-absorbing panel 10 is formed by bonding the first sheet layer 30 and the second sheet layer 40 respectively to the first surface and the second surface of the core layer 20 as described above.

As shown in FIGS. 2B, 3A to 3C, and 4, the core layer 20 includes a plurality of openings 50 connecting an internal space of the cells S and an external space of the core layer 20. The openings 50 in the first cells S1 are cut out of the partition walls 23 of the core layer 20 from the side at which the second sheet layer 40 is located and formed in the partition walls 23 and the single-layered second outer wall 22. In the same manner as the first cells S1, the openings 50 in the second cells S2 are cut out of the partition walls 23 of the core layer 20 from the side at which the second sheet layer 40 is located and formed in the partition wall 23 and the double-layered second outer wall 22a.

Figure 4:
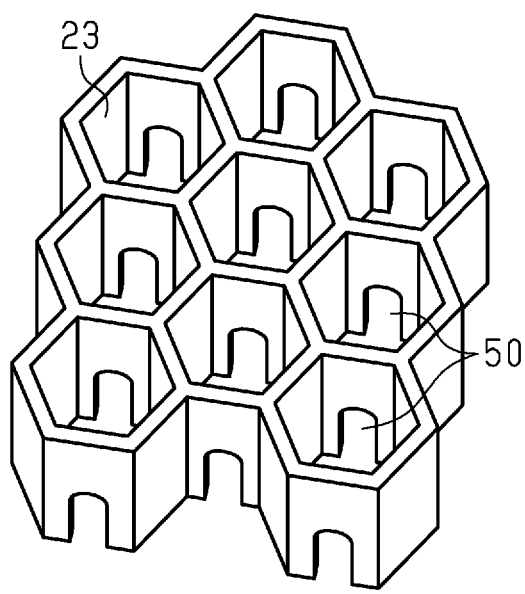
FIG. 4 is a diagram illustrating openings in the core layer of the sound-absorbing panel shown in FIG. 2A.

As shown in FIG. 4, each opening 50 is formed in the corresponding partition wall 23 at a substantially central location in a widthwise direction. Further, in the core layer 20 having the honeycomb structure, among the six partition walls 23 forming a single cell S, the openings 50 extend through two opposing partition walls 23. FIG. 4 shows only the partition walls 23 of the core layer 20 to facilitate understanding of locations where the openings 50 are formed.

As shown in FIG. 2B, the first sheet layer 30 includes a first skin layer 30a and a first adhesive layer 30b. The first skin layer 30a is formed from a polyamide resin and located at an outer side (front side of sound-absorbing panel 10). The first adhesive layer 30b is bonded with the first skin layer 30a. The first sheet layer 30 has a double-layer structure. The first skin layer 30a is bonded with the core layer 20 by the first adhesive layer 30b. That is, in the sound-absorbing panel 10, the first adhesive layer 30b is located between the core layer 20 and the first skin layer 30a.

In the same manner as the first sheet layer 30, the second sheet layer 40 includes a second skin layer 40a and a second adhesive layer 40b. The second skin layer 40a is formed from a polyamide resin and located at the outer side (rear side) of sound-absorbing panel 10. The second adhesive layer 40b is bonded with the second skin layer 40a. The second sheet layer 40 has a double-layer structure. The second skin layer 40a is bonded with the core layer 20 by the second adhesive layer 40b. That is, in the sound-absorbing panel 10, the second adhesive layer 40b is located between the core layer 20 and the second skin layer 40a.

As shown in FIGS. 2A and 2B, the first wall 10a of the sound-absorbing panel 10 includes a plurality of through holes 60 connecting the internal space of the cells S and the external space to which the first skin layer 30a is exposed. More specifically, as shown in FIG. 2B, the through holes 60 that are connected to the first cells S1 extend through the first sheet layer 30 and the double-layered first outer wall 21 of the core layer 20. The through holes 60 that are connected to the second cells S2 extend through the second sheet layer 40 and the single-layered first outer wall 21 of the core layer 20. In the present embodiment, a through hole 60 is arranged in each cell S at a substantially central portion.

The polyamide resin used for the core layer 20, the first skin layer 30a, and the second skin layer 40a may be a known nylon resin, for example, nylon 6. A nylon resin has superior scratch resistance (wear resistance), impact resistance, heat resistance, low-temperature resistance, oil resistance, chemical resistance, and mechanical strength. Examples of the nylon resin include nylon 6, nylon 11, nylon 12, nylon 66, nylon 610, nylon 6T, nylon 61, nylon 9T, nylon M5T, nylon 612, and the like. Among the above nylon resins, nylon 6 having a proper resiliency (flexibility) is superior in scratch resistance and impact resistance.

The resin forming the core layer 20, the first skin layer 30a, and the second skin layer 40a may be polyamide elastomer resin in which an elastomer is mixed with a polyamide resin. The polyamide elastomer resin has superior resiliency (flexibility). This improves the impact resistance of each layer forming the sound-absorbing panel 10. Among the layers forming the sound-absorbing panel 10, at least the first skin layer 30a, which is exposed to the external space, may be formed from a polyamide elastomer resin. Alternatively, only the first skin layer 30a may be formed from a polyamide elastomer resin and the core layer 20 and the second skin layer 40a may be formed from a polyamide resin that does not include an elastomer. This will allow the sound-absorbing panel 10 to maintain strength in a preferred manner while having impact resistance at the front surface exposed to the external space.

To facilitate processing of the sound-absorbing panel 10, among nylon resins, it is preferred that a nylon resin having a water absorption rate of 0.5% or greater and 1.0% or less be used, further preferably, a nylon resin having a water absorption rate of 0.5% or greater and 0.7% or less be used, and even further preferably, a nylon resin having a water absorption rate of 0.5% or greater and 0.6% or less be used. If the water absorption rate is set in this range, the nylon resin will not foam when absorbing moisture from the air during molding process of the sound-absorbing panel 10, storage of the sound-absorbing panel 10, or manufacturing of the sound-absorbing panel 10.

The first adhesive layer 30b of the first sheet layer 30 is formed by a modified polyolefin-based adhesive, which is a modified resin in which a functional group is added to polypropylene to obtain an adhesive property. Examples of the modified polyolefin-based adhesive include modified polyethylene and modified polypropylene. The first sheet layer 30 may be manufactured, for example, through coextrusion in a state in which the first skin layer 30a is integrated with and the first adhesive layer 30b. Alternatively, the first skin layer 30a and the first adhesive layer 30b may be manufactured separately and then bonded through heat-welding.

The second skin layer 40a and the second adhesive layer 40b of the second sheet layer 40 may each be formed from the same material as the first skin layer 30a and the first adhesive layer 30b of the first sheet layer 30. The second adhesive layer 40b of the second sheet layer 40 may have the same thickness as the first adhesive layer 30b of the first sheet layer 30. Instead, as shown in FIG. 2B, the second skin layer 40a of the second sheet layer 40 may be thinner than the first skin layer 30a of the first sheet layer 30.

The thickness of the core layer 20 may be set so that Helmholtz resonance occurs at the frequency subject to sound absorption. The Helmholtz resonance frequency is set based on the internal volume of the cell S, the thickness of the first sheet layer 30, and the cross-sectional area of the through hole 60, that is, when multiple through holes 60 are formed in a single cell S, the total cross-sectional area of the through holes in the single cell S, and the like. The thickness of the first sheet layer 30 is set in accordance with the frequency subject to sound absorption. Alternatively, the thickness of the first sheet layer 30 is set in accordance with the flexural strength or impact resistance required for the sound-absorbing panel 10. For example, the thickness of the first sheet layer 30 may be set to approximately 0.5 to 1.5 mm. Although the thickness of the second sheet layer 40 is not particularly limited, when the thickness is set to, for example, approximately 0.4 to 1.0 mm, the weight can be reduced.

A method for manufacturing the sound-absorbing panel 10 will now be described. The method for manufacturing the sound-absorbing panel 10 includes a step of shaping the core layer 20, a step of forming the openings 50 in the core layer 20, a step of forming a hollow structure by bonding the core layer 20 with the first sheet layer 30 and the second sheet layer 40, a step of bending the hollow structure, a step of performing an end surface processing on the hollow structure, and a step of forming the through holes 60 in the hollow structure. The order in which these steps are performed may be changed. For example, the step of forming the openings 50 in the core layer 20 may be performed after the step of forming the through holes 60 in the hollow structure.

First, the step of shaping the core layer 20 by folding a single sheet member 100 will now be described.

Figure 5A:
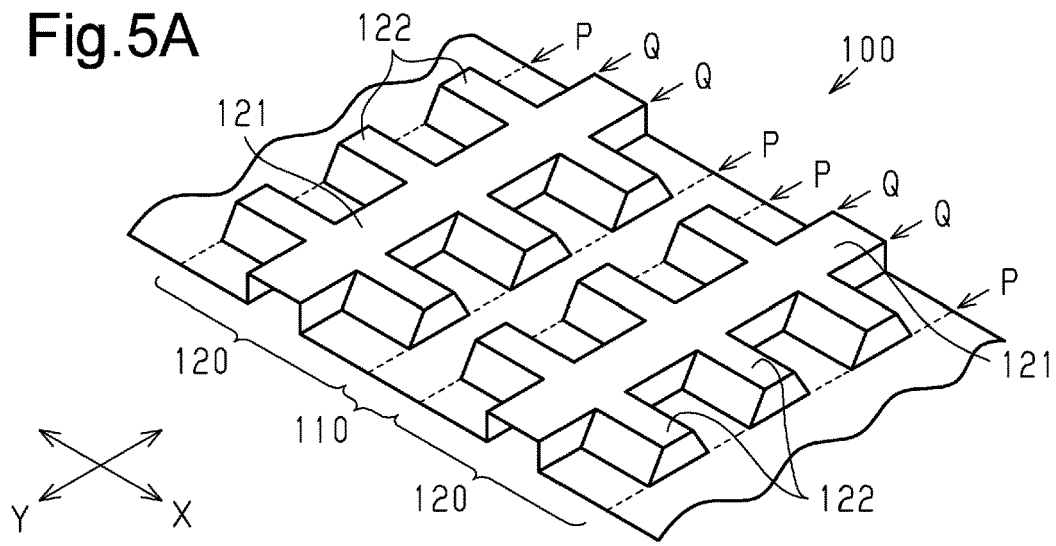
FIG. 5A is a perspective view of a sheet member forming a core layer that is a resin structure of the sound-absorbing panel shown in FIG. 2A.

As shown in FIG. 5A, a single sheet made of a polyamide is shaped into a predetermined form to obtain the sheet member 100. The sheet member 100 includes strip-shaped flat surface regions 110 and bulged regions 120, which are alternately arranged in a transverse direction (direction X) of the sheet member 100. Each bulged region 120 includes a first bulged portion 121 extending across the entire bulged region 120 in the direction in which the bulged region 120 extends (direction Y).

The first bulged portion 121 includes a bulged surface and two connection surfaces and has the form of a groove that opens downward. The bulged surface is bulged from the flat surface region 110, and the connection surfaces intersect with the bulged surface. The bulged surface of the first bulged portion 121 may be orthogonal to the connection surfaces.

The width of the first bulged portion 121, or the transverse length of the first bulged portion 121, is equal to the width of the flat surface region 110 and two times greater than the bulging height of the first bulged portion 121, or the transverse length of the connection surface.

As shown in FIG. 5A, the bulged region 120 includes a plurality of second bulged portions 122. Each second bulged portion 122 has a trapezoidal cross-section, which is obtained by dividing a regular hexagon into two along the longest diagonal line. The second bulged portions 122 are orthogonal to the first bulged portion 121. The second bulged portions 122 are bulged to the same height as the first bulged portion 121. Further, the distance between two adjacent second bulged portions 122 is equal to the width of the bulged surface of each second bulged portion 122.

The first bulged portion 121 and the second bulged portions 122 are formed by bulging parts of the sheet using the plasticity of the sheet. Further, the sheet member 100 may be shaped from a single sheet through a known molding process such as a vacuum molding or a compression molding.

Figure 5B:
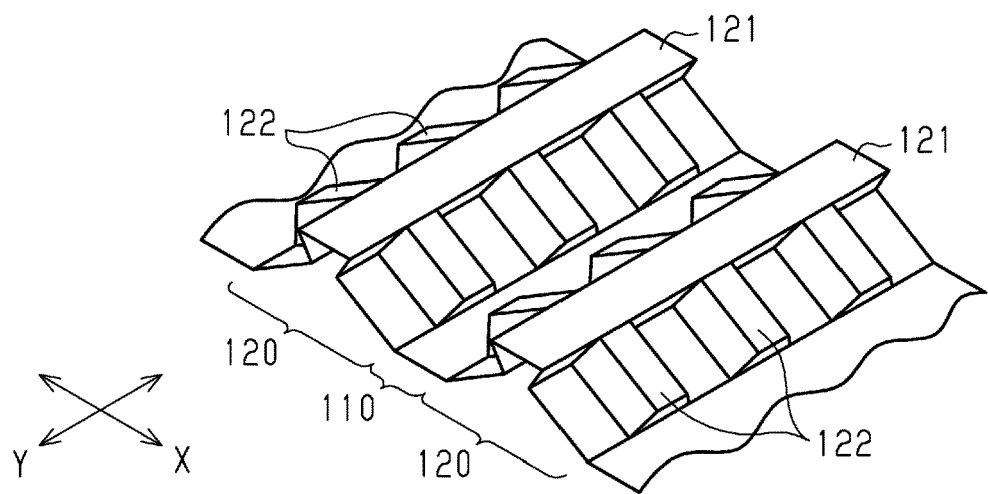
FIG. 5B is a perspective view of the sheet member shown in FIG. 5A when being folded.

As illustrated in FIGS. 5A and 5B, the core layer 20 is formed by folding the sheet member 100, which has been shaped as described above along boundaries P and Q. More specifically, the sheet member 100 is folded inward at boundaries P between the flat surface regions 110 and the bulged regions 120 and folded outward at boundaries Q between the bulged surfaces of the first bulged portions 121 and the connection surfaces. In this way, the sheet member 100 is compressed in direction X.

Figure 5C:
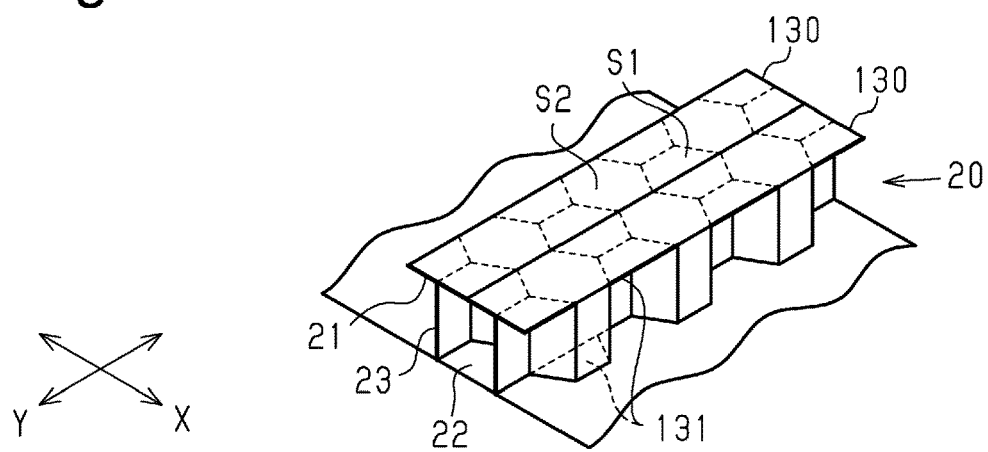
FIG. 5C is a perspective view of the sheet member shown in FIG. 5A after being folded.

Then, as illustrated in FIGS. 5B and 5C, folding is performed so that the bulged surfaces of the first bulged portions 121 overlap with the connection surfaces, and folding is performed so that the end surfaces of the second bulged portions 122 overlap with the flat surface regions 110. This forms one partitioned body 130, which is a polygonal post and extends in direction Y, from each bulged region 120. Such partition bodies 130 are continuously formed in direction X to form the plate-like core layer 20.

In this case, the portion corresponding to the bulged surfaces and the connection surfaces of the first bulged portions 121 forms the first outer wall 21 of the core layer 20, and the portion corresponding to the end surfaces of the second bulged portions 122 and the flat surface regions 110 forms the second outer wall 22 of the core layer 20. As shown in FIG. 5C, overlapped portions 131 are formed by the double-layered portions where folding is performed so that the bulged surfaces and the connection surfaces of the first bulged portions 121 overlap each other in the first outer wall 21. Further, overlapped portions 131 are formed by the double-layered portions where folding is performed so that the end surfaces of the second bulged portions 122 and the flat surface region 110 are overlap each other in the second outer wall 22.

As shown in FIG. 5C, the hexagonal regions where the second bulged portions 122 are folded form the second cells S2, and the hexagonal regions defined between two adjacent partition bodies 130 form the first cells S1. In the present embodiment, the bulged surfaces and connection surfaces of the second bulged portions 122 form the partition walls 23 of the second cells S2. Further, the connection surfaces of the second bulged portions 122 and flat surface portions located between the second bulged portions 122 of the bulged regions 120 form the partition walls 23 of the first cells S1. Moreover, the double-layered partition walls 23 are formed by portions where the bulged surfaces of the second bulged portions 122 are in contact with each other and portions where the above-described flat surface portions are in contact with each other in the bulged region 120. In addition, the first end of each first cell S1 is closed by the two overlapped portions 131 and the second end of each second cell S2 is closed by the two overlapped portions 131. When performing such a folding process, the sheet member 100 may be heated and softened.

Subsequently, the openings 50 are formed in the core layer 20 obtained in the manner described above. The opening 50 can be formed by piercing a side surface of the core layer 20 along the second outer wall 22 of the core layer 20 with an opening jig, for example, a drill, a needle, a punch, or a heating rod.

Opening jigs are arranged at intervals substantially equal to the interval between the centers of two adjacent cells S in direction Y of FIG. 2A. A lower edge of each opening jig is located at a position corresponding to the lower surface of the core layer 20 (lower surface of second outer wall 22). The opening jigs are arranged relative to the core layer 20 in direction X of FIG. 2A, and the opening jigs are then relatively moved in direction X to simultaneously form the openings 50 in the core layer 20. The openings 50 may also be formed by moving the opening jigs toward the partition walls 23 from the side at which the second outer wall 22 of the core layer 20 is located.

Thus, in the first cells S1, the openings 50 are formed in the partition walls 23 and the single-layered outer wall 22 of the core layer 20 by cutting out the partition walls 23 of the core layer 20 from the side at which the second outer wall 22 is located. Further, the openings 50 are formed in the partition walls 23 of the core layer 20 and the double-layered second outer wall 22 in the second cells S2 in the same manner as the first cells S1. The openings 50 open toward the side of the core layer 20, and lower ends of the openings 50 open downward (toward rear surface of sound-absorbing panel 11).

The cells S, the openings 50, and the through holes 60 are arranged next to one another in the direction in which the sound-absorbing panel 10 extends (planar direction of sound-absorbing panel 10), or in direction X and direction Y in which the sound-absorbing panel 10 extends. Direction X and direction Y are orthogonal to a thickness-wise direction of the sound-absorbing panel 10.

Next, the first sheet layer 30 is bonded with the first surface of the core layer 20 through heat-welding, and the second sheet layer 40 is bonded with the second surface of the core layer 20 through heat-welding. This forms a hollow structure including the core layer 20 and the sheet layers 30 and 40.

The heating temperature when heat-welding the first sheet layer 30 and the second sheet layer 40 to the core layer 20 is set to a temperature that is higher by a few degrees to less than twenty degrees than the melting point of the adhesive layer 30b of the sheet layer 30 and the adhesive layer 40b of the sheet layer 40. Specifically, the heating temperature is set to a few degrees higher than the melting point of a modified polyolefin-based adhesive, which is a modified resin forming the adhesive layers 30b and 40b. The heating temperature is set to be sufficiently lower than a molding temperature for softening the polyamide resin forming the core layer 20 and the skin layers 30a and 40a.

The heating time for heat-welding the sheet layers 30 and 40 to the core layer 20 is set to several seconds to less than twenty seconds so that the same portion of the sheet layers 30 and 40 will not be heated over a long period of time. Thus, temperatures of the core layer 20 and the skin layers 30a and 40a will not reach a high temperature that results in softening and melting. This allows for softening and melting of only the adhesive layers 30b and 40b without the need for strict control of the heating temperature.

Subsequently, the hollow structure is bent in correspondence with the shape of portions where the sound-absorbing panel 10 is arranged. In the present embodiment, the hollow structure is bent into a curved panel in correspondence with the inner circumferential surface of the nacelle 4.

When bending the hollow structure, for example, two heated panels having the shape of the portion where the sound-absorbing panel 10 is arranged are prepared to sandwich the hollow structure. This heats and changes the shape of the hollow structure. The heating temperature when bending the hollow structure is set to several degrees higher than the melting point of the polyamide resin in the core layer 20 and the sheet layers 30 and 40. The heating time is set between several seconds to less than twenty seconds so that the hollow structure will not be heated for too long and melted.

Then, an end surface processing is performed on the hollow structure. Further, the through holes 60 are formed from the side at which the first sheet layer 30 of the hollow structure is located.

The through hole 60 is formed by piercing a piercing jig, for example, a drill, a needle, or a puncher through the first wall 10a of the hollow structure. Piercing jigs may be arranged at intervals substantially equal to the interval between the centers of two adjacent cells S. The distal ends of the arranged piercing jigs are directed toward the hollow structure, and the piercing jigs are relatively moved to simultaneously form the through holes 60. The through holes 60 improve the sound absorption performance of the hollow structure of the sound-absorbing panel 10. In the obtained sound-absorbing panel 10, a single through hole 60 is formed at a substantially central portion in each cell S of the first wall 10a.

The steps described above are performed to manufacture the sound-absorbing panel 10 that is applicable to a jet engine of an aircraft.

The sound-absorbing panel 10 of the present embodiment has the following advantages.

(1) The core layer 20, the first sheet layer 30, and the second sheet layer 40 included in the sound-absorbing panel 10 are formed from a polyamide resin thereby reducing the weight of the sound-absorbing panel 10. This reduces the weight of the aircraft to which the sound-absorbing panel 10 is attached and improves the fuel efficiency of the aircraft.

(2) A surface of a metal sound absorbing-panel is easily scratched. Scratches may disturb the air flow in the external space, for example, the air passage, of the panel. In this respect, the sound-absorbing panel 10 is formed from a resin and thus has superior scratch resistance. Thus, the sound-absorbing panel 10 is not easily scratched even when the aircraft, to which the sound-absorbing panel 10 is attached, takes off or lands at an airport or the like in a desert region and sand or dust collects on the sound-absorbing panel 10.

(3) The shape of the resin sound-absorbing panel 10 can be changed more easily than a metal sound-absorbing panel. For example, heated panels having predetermined shapes can be pressed against the sound-absorbing panel 10 to easily change the shape of the sound-absorbing panel 10. This allows for freedom in its design to conform to the shape of the portion where the sound-absorbing panel 10 is arranged. For example, the sound-absorbing panel 10 can readily be shaped to be arcuate in correspondence with the shape of the outer circumferential surface of the engine 2 or the air passage. Further, ridges and valleys can easily be formed in the sound-absorbing panel 10 in correspondence with the ridges and valleys of the portion where the sound-absorbing panel 10 is arranged. Moreover, the sound-absorbing panel 10 can readily be heated and melted to be heat-welded with another sound-absorbing panel 10 or laminated in layers. The sound-absorbing panels 10 can also be bonded with each other by fasteners, for example, bolts and nuts instead of heating and melting the resin for the heat-welding.

(4) The sound-absorbing panel 10 is formed from a resin, for example, a polyamide resin. Use of a polyamide resin, particularly a nylon resin, obtains the sound-absorbing panel 10 having superior scratch resistance (wear resistance), impact resistance, heat resistance, low-temperature resistance, oil resistance, chemical resistance, and mechanical strength. The strength of the sound-absorbing panel 10 can be maintained even when the aircraft is exposed to a low temperature of −70° C. while flying or a high temperature of 60° C. when taking off or landing at an airport or the like in a desert region. Further, the sound-absorbing panel 10 formed from a resin resists scratching caused by foreign objects such as sand or dust. Moreover, the sound-absorbing panel 10 formed from a polyamide resin having superior flexibility, such as nylon 6, can absorb the impact of a striking object, for example, even when a bird or ice in the cloud strikes the inside of the jet engine during a flight. This limits spreading of damage caused from an object striking the sound-absorbing panel 10.

(5) If the sound-absorbing panel 10 is formed from a polyamide resin having a water absorption rate higher than or equal to a predetermined value, the polyamide resin may foam when absorbing moisture from the air during the molding step of the sound-absorbing panel 10. In this respect, a nylon resin having a water absorption rate of 1.0% or less is employed to limit foaming of the polyamide resin and facilitate processing when molding or bending the sound-absorbing panel 10.

(6) The first wall 10*a* of the sound-absorbing panel 10 includes a plurality of the through holes 60. Thus, the sound-absorbing panel 10 functions as a Helmholtz resonator and absorbs noise in the external space of the panel through where the noise propagates, such as the air passage of the jet engine.

(7) A desired sound absorption effect can be obtained by changing the number, shape, or size of the through holes 60.

Further, the desired sound absorption can be obtained by changing at least one of the thickness of the core layer 20 or the internal volume of each cell S.

(8) The first surface and the second surface of the core layer 20 are bonded with the walls 21 and 22, each of which has a single-layered or double-layered structure. Thus, the core layer 20 is bonded along a plane with the first sheet layer 30 and along a plane with the second sheet layer 40. In this case, the sound-absorbing panel 10 has a higher strength compared to when the sheet layers 30 and 40 are respectively bonded with two surfaces of the honeycomb structure or when the sheet layers 30 and 40 are respectively bonded with two surfaces of the honeycomb body formed only by partition walls.

(9) Parts of the partition walls 23 and the second outer wall 22 of the core layer 20 include the openings 50 connecting the internal space of the cells S and the external space of the core layer 20. This releases the moisture condensed inside the sound-absorbing panel 10 from the sound-absorbing panel 10 even when the jet engine is exposed to a large temperature difference.

(10) The outer surface of the first wall 10*a* of the sound-absorbing panel 10 is flat except for the portions where the through holes 60 are formed. Thus, even when the first wall 10*a* is arranged to face the external space such as the air passage of the jet engine, the disturbance of air current will be limited. This limits decreases in the fuel efficiency of the aircraft.

(11) The through holes 60, which are connected to the first cells S1 of the core layer 20, extend through the double-layered first outer wall 21 and the first sheet layer 30. Further, the through holes 60, which are connected to the second cells S2 of the core layer, extend through the single-layered first outer wall 21 and the first sheet layer 30. In this way, the through holes 60 are alternately formed in the single-layered portion of the first outer wall 21 and the double-layered portion of the first outer wall 21. Thus, decrease in the strength of the sound-absorbing panel 10 resulting from the formation of the through holes 60 is less than when the first outer wall 21 has a single-layered structure.

(12) Near the central portion of each cell S including the through hole 60, a non-bonded portion may be located between the first outer wall 21 and the first sheet layer 30 of the core layer 20. In this case, a small layer of air may be formed between the first outer wall 21 and the first sheet layer 30 at the non-bonded portion. This improves the sound absorption performance of the sound-absorbing panel 10.

(13) The heating temperature for heat-welding the first sheet layer 30 and the second sheet layer 40 to the core layer 20 is set to a temperature that is higher than the melting point of the adhesive layer 30*b* of the sheet layer 30 and the adhesive layer of the sheet layer 40 by several degrees to less than twenty degrees. Further, the heating time of heat-welding the sheet layers 30 and 40 to the core layer 20 is set to several seconds to less than twenty seconds. Thus, the core layer 20 and the skin layers 30*a* and 40*a* will not reach a high temperature that causes softening and melting. This allows for softening and melting of only the adhesive layers 30*b* and 40*b* during heat-welding and does not require strict control of the heating temperature.

(14) The adhesive layer 30*b*, which bonds the core layer 20 and the skin layer 30*a*, and the adhesive layer 40*b*, which bonds the core layer 20 and the skin layer 40*a* of the core layer 20, are formed by a modified polyolefin-based adhesive that is a modified resin in which a functional group is added to polypropylene to obtain an adhesive property.

Examples of the modified polyolefin-based adhesive include modified polyethylene and modified polypropylene. This improves delamination strength of the skin layers 30a and 40a from the core layer 20.

(15) The second skin layer 40a that is thinner than the first skin layer 30a reduces the weight of the sound-absorbing panel 10. In this case, the first skin layer 30a, which is thicker relative to the second skin layer 40a, has a higher contraction rate than the second skin layer 40a. Thus, the sound-absorbing panel 10 is readily curved in a manner that a contraction amount of the front surface becomes greater than a contraction amount of the rear surface. Therefore, the hollow structure can readily be bent during the bending process of the hollow structure by increasing the thickness of the skin layer at the side that needs to be contracted and decreasing the thickness of the skin layer at the side that needs to be extended.

(16) The cells S of the core layer 20 are closed by the single-layered first outer wall, the single-layered first outer wall, the double-layered first outer wall, or the double-layered second outer wall. Thus, a large bonded area is obtained between the core layer 20 and the first sheet layer 30, and the second sheet layer 40 has superior delamination strength. This limits the scattering of damaged portions even when a bird or mass of ice enters the jet engine and damages the sound-absorbing panel 10.

(17) The core layer 20 is a continuous honeycomb structure. This improves the impact strength of the entire sound-absorbing panel 10.

The above embodiment may be modified as follows. Further, components of the above embodiment and the following modifications can be combined as long as there is no technical contradiction.

The core layer 20 may be formed by folding a plurality of sheets instead of folding a single sheet member 100. For example, the core layer may be formed by bending strip-shaped sheets at predetermined intervals and arranging the bent sheets next to one another.

The core layer 20 does not have to be formed by folding or bending a sheet. For example, a honeycomb structure including only the partition walls 23 may be formed through injection molding.

In the above embodiment, the core layer 20 includes the cells S, which have the form of hexagonal posts. However, the form of the cells is not particularly limited. The cells S may have, for example, a polygonal form, such as a rectangular post or an octagonal post, or a cylindrical form. In this case, the cells of different forms may be mixed. The cells do not have to be adjacent to each other and a gap (space) may extend between two cells.

The sound-absorbing panel 10 may be formed by, for example, preparing a core layer including cells formed by hollow posts bulging from a body of a sheet toward one side and bonding the sheet layers 30 and 40 respectively with a bulged surface of the core layer and a portion of the core layer located at a side opposite to the bulged surface. Alternatively, a double-layered core layer may be formed by preparing two sheet bodies including a plurality of hollow cells and bonding the bulged surfaces of the cells with each other. The hollow post portion bulged from the sheet may have the shape of a cylinder, of which the diameter is constant in a bulging direction, or a truncated cone, of which the diameter decreases toward the bulged surface.

The adhesive layer 30b of the sheet layer 30 and the adhesive layer 40b of the sheet layer 40 do not have to be formed from a polyamide resin elastomer. For example, as long as the material used has a melting point lower than that of the polyamide resin forming the core layer 20 and the skin layers 30a and 40a, the adhesive layers 30b and 40b can solely be softened and melt without softening and melting the core layer 20 and the skin layers 30a and 40a during heat-welding.

When arranging the sound-absorbing panel 10, the first skin layer 30a, which is exposed to the external space, may be formed from a material obtained by mixing an elastomer in a polyamide resin, and the core layer 20 and the second skin layer 40a may be formed from a polyamide resin that is free from elastomer. This maintains the strength of the sound-absorbing panel 10 in a preferred manner while improving impact resistance of the front surface of the sound-absorbing panel 10.

In the above embodiment, the skin layer 30a of the sheet layer 30 and skin layer 40a of the sheet layer 40 are single-layered, but the layers may be a laminated body having two or more layers.

Figure 6:
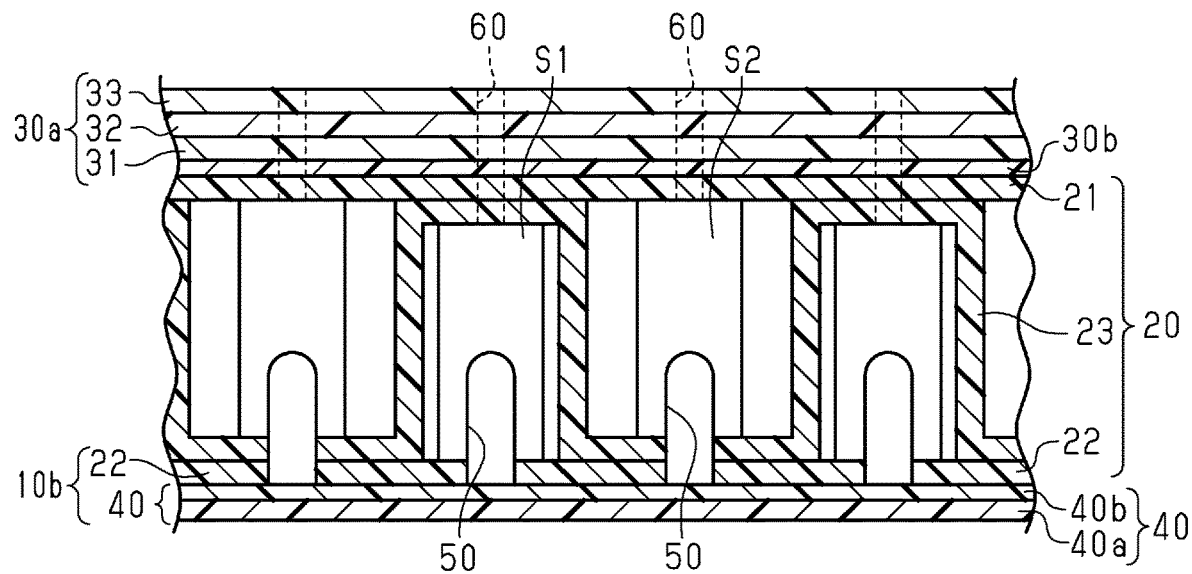
FIG. 6 is a diagram illustrating a modified example of the sound-absorbing panel.

For example, as shown in FIG. 6, the first skin layer 30a may be a laminated body including an inner layer 31, an outer layer 33, and an intermediate layer 32 sandwiched between the inner layer 31 and an outer layer 33. In this case, the layers 31, 32, and 33 may each be formed from a polyamide resin having a different hardness. For example, the intermediate layer 32 is formed from a polyamide resin having a relatively high hardness, and the layers 31 and 33 sandwiching the intermediate layer 32 is formed from a polyamide resin having a relatively low hardness. This allows for adjustment of impact resistance in a preferred manner. Specifically, the relatively soft layers 31 and 33 absorb impacts, and the relatively hard intermediate layer 32 obtains rigidity to receive impacts as a plane.

When an impact is applied to the core layer of the honeycomb structure, for example, with the core layer including a plurality of cells shaped as truncated cones or as cylinders that are arranged next to one another, damages may be inflicted particularly to bonded portions between the partition walls and the first outer wall of the core layer. The damage tends to easily spread from such a portion to the entire core layer. In this respect, the intermediate layer 32 counters the impact as a plane, and the entire inner layer 31 located at the inner side propagates the impact to the core layer while absorbing the impact. This limits spreading of the damage.

The hardness of the three-layered first skin layer 30a can be adjusted by, for example, changing the material from nylon 12, which is a polyamide resin, to nylon 12 elastomer resin, in which elastomer is mixed when necessary.

The first skin layer 30a and the second skin layer 40a may have different layer structures. For example, one of the skin layers 30a and 40a may have a structure with two or more layers and the other one may have a single-layered structure.

In a case where the skin layer is a laminated body, the thickness of each layer in the laminated body may be the same or different. For example, when the first skin layer 30a has a triple-layered structure, the layers 31 and 33 may have the same thickness and the intermediate layer 32 may be thinner than the layers 31 and 33. Alternatively, the intermediate layer 32 may be approximately twice as thick as the layers 31 and 33.

The outer surface of the first skin layer 30a may include a layer of a resin other than a polyamide resin, for example, an acrylic layer. This improves scratch resistance and impact resistance. Such a layer structure may differ between the first sheet layer 30 and the second sheet layer 40.

The first skin layer 30a may have the same thickness as the second skin layer 40a. Alternatively, the first skin layer 30a may be thinner than the second skin layer 40a.

The openings 50 in the core layer 20 may extend through the second sheet layer 40. Such an opening 50 can be formed by inserting an opening jig, for example, a drill, a needle, a punch, or a heating rod along the second sheet layer 40 or inserting the distal end of the opening jig into the second sheet layer 40 after bonding the first sheet layer 30 and the second sheet layer 40 to the core layer 20.

Figure 7:
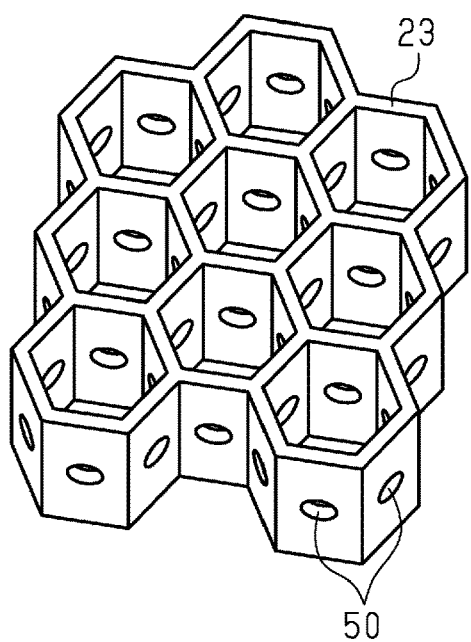
FIG. 7 is a diagram illustrating a modified example of the openings.

The openings 50 extending through the partition walls 23 of the core layer 20 do not have to be cut out from the side at which the second sheet layer 40 is located. For example, as shown in FIG. 7, the opening 50 may be a circular hole extending through the central portion of the partition wall 23. Further, the opening 50 may be formed in the two adjacent partition walls 23. FIG. 7 only shows the partition walls 23 of the core layer 20 to facilitate understanding of locations and shape of the openings 50.

The openings 50 may be formed in any one of the six partition walls 23 forming a single cell S in addition to the two opposing partition walls 23. For example, the opening 50 may be arranged in each of the partition walls 23 forming a single cell S.

The openings 50 do not have to be formed in each cell S and may be formed in only some of the cells S.

The openings 50 are formed in two opposing ones of the partition walls 23 of the cell S by performing piercing along the second outer wall 22 of the core layer 20 or by piercing the partition walls 23 orthogonally with an opening jig, for example, a drill, a needle, a punch, or a heating rod. More specifically, multiple opening jigs are arranged at intervals substantially corresponding to the interval between the centers of two adjacent cells S and simultaneously inserted into multiple partition walls 23 to form through holes in two opposing ones of partition walls 23 of each cell S. However, the openings 50 may be formed at intervals narrower than the intervals of the cells S by decreasing the intervals of the opening jigs from that of the cells S. In this case, the openings 50 are not necessarily formed in two opposing ones of the partition walls 23. However, even when the insertion positions of the opening jigs are shifted, at least one opening 50 will be formed in each cell S.

The cells S may be displaced from their appropriate positions when folding the core layer 20. This may result in an error in the pitch of the cells S when forming the sound-absorbing panel 10. In this case, when the interval between the opening jigs are narrower than the pitch of the cells S, at least one opening 50 can still be formed in each cell S even if there is an error in the pitch of the cells S.

The interval of the opening jigs may be wider than the pitch of the cells S.

In the above embodiment, a single through hole 60 is formed in a substantially central portion of the first end of each cell S. However, the number and location of the through hole 60 are not limited in such a manner. For example, a plurality of through holes 60 may be formed in each cell S. In this case, for example, the interval at which the piercing jigs are arranged is decreased from the interval between the centers of two adjacent cells S in the step of forming the through holes 60. This allows for formation of at least one through hole 60 in each cell S. Further, the through hole 60 does not have to be formed in each cell S and may be formed only in some of the cells S.

The shape of through hole 60 is not particularly limited. For example, the through hole 60 may have a circular or rectangular cross section or a cross section of an unspecified shape. Further, a bent piece may be formed at the periphery of the through hole 60 by bending the first wall 10a. For example, when a sharp piercing jig is used to form the through hole 60, the distal end of the piercing jig forms a hole in the first wall 10a when the piercing jig pierces the first wall 10a of the hollow structure. As the piercing jig further moves into the cell S, the piercing jig presses the periphery of the first wall 10a around the hole into the cell S. In this way, the first wall 10a is bent into the cell S to form the bent piece at the portion where the through hole 60 is formed. In this case, at the portion where the through hole 60 is formed, the boundary of the first wall 10a and the bent piece is curved, and the distal end of the bent piece is located in the internal space of the cell S.

In the above embodiment, the hollow structure is bent into a curved panel with heated panels but does not have to be bent with heated panels. For example, the hollow structure and bending jigs may be heated in a heated furnace, and then the heated hollow structure may be sandwiched between the jigs and bent. Instead of heating and bending the hollow structure, part of one of the sheet layers 30 and 40 of the hollow structure or part of one of the sheet layers 30 and 40 and the core layer 20 may be machined or cut for removal, and then the hollow structure may be bonded with a new sheet layer to form a curved panel. A desired curved surface can be formed in accordance with the shape obtained through machining or cutting.

In the above embodiment, the hollow structure is bent into a curved panel having a constant thickness. However, a process for changing the thickness of the hollow structure may be performed. For example, a process for decreasing the thickness of part of the hollow structure or a process for forming ridges and valleys in the surfaces of the hollow structure may be performed simultaneously with, prior to, or subsequent to the bending process. In this case, for example, it is preferred that a heated panel having ridges and valleys in its surface be used.

Depending on the shape of the portions where the sound-absorbing panel 10 is attached, the sound-absorbing panel 10 does not have to be bent. In this case, the through holes 60 is formed in the hollow structure without performing the process for bending the hollow structure.

The invention claimed is:

1. A sound-absorbing panel attached to and used with an inner circumferential surface of a nacelle of a jet engine of an aircraft, the sound-absorbing panel comprising:
   a core layer having a honeycomb structure and including a first surface, a second surface at a side opposite to the first surface, and a plurality of partition walls extending between the first surface and the second surface and partitioning a plurality of cells;
   a first skin layer laminated on the first surface of the core layer; and
   a second skin layer and laminated on the second surface of the core layer, wherein
   the core layer, the first skin layer and the second skin layer are formed from a nylon resin having a water absorption rate of 1.0% or less in which an elastomer is mixed with the nylon resin,
   the core layer is adhered to the first skin layer and the second skin layer by a modified polyethylene or a modified polypropylene,
   the second skin layer has a thickness less than the first skin layer,
   the first skin layer is exposed to an external space when in use and includes a plurality of through holes connecting an internal space of the cells and the external space to which the first skin layer is exposed, the core layer includes a plurality of openings connecting the internal space of the cells and the external space of the core layer, the core layer includes an outer wall forming the first surface and adhered to the first skin layer, and the through holes extend through the first skin layer and the outer wall.

2. The sound-absorbing panel according to claim 1, wherein the nylon resin is nylon 6.

3. A sound-absorbing panel attached to and used with an inner circumferential surface of a nacelle of a jet engine of an aircraft, the sound-absorbing panel comprising:

a core layer having a honeycomb structure and including a first surface, a second surface at a side opposite to the first surface, and a plurality of partition walls extending between the first surface and the second surface and partitioning a plurality of cells;

a first skin layer formed and laminated on the first surface of the core layer; and a second skin layer formed and laminated on the second surface of the core layer, wherein the core layer, the first skin layer and the second skin layer are formed from a nylon resin having a water absorption rate of 1.0% or less in which an elastomer is mixed with the nylon resin, the core layer is adhered to the first skin layer and the second skin layer by a modified polyethylene or a modified polypropylene, the second skin layer has a thickness less than the first skin layer, the first skin layer is a laminated body including an outer layer exposed to an external space when in use, an inner layer, and an intermediate layer sandwiched between the outer layer and the inner layer, a resin forming the intermediate layer has a higher hardness than a resin forming the outer layer and the inner layer, the first skin layer includes a plurality of through holes connecting an internal space of the cells and the external space to which the outer layer is exposed, the core layer includes an outer wall forming the first surface and adhered to the first skin layer, and the through holes extend through the first skin layer and the outer wall.

4. A method for manufacturing a sound-absorbing panel attached to and used with an inner circumferential surface of a nacelle of a jet engine of an aircraft, the method comprising:

forming a nylon resin core layer including a first surface, a second surface at a side opposite to the first surface, and a plurality of partition walls extending between the first surface and the second surface and partitioning a plurality of cells;

forming a plurality of openings in the nylon resin core layer to connect an internal space of the cells and an external space of the nylon resin core layer;

cutting part of the nylon resin core layer from removal and then bonding a first skin layer formed from a nylon resin to the first surface of the nylon resin core layer;

bonding a second skin layer formed from a nylon resin to the second surface of the nylon resin core layer; and forming a plurality of through holes in the first skin layer to connect the internal space of the cells and the external space to which the first skin surface is exposed, and wherein the nylon resin in the nylon resin core layer, the first skin and the second skin have a water absorption rate of 1% or less in which an elastomer is mixed with the nylon resin.

5. The method according to claim 4, wherein the first skin layer, the core layer, and the second skin layer that are bonded together form a hollow structure, and the method further comprises bending the hollow structure.

* * * * *